United States Patent
Abrol et al.

(10) Patent No.: US 7,860,032 B2
(45) Date of Patent: Dec. 28, 2010

(54) APPARATUS AND METHOD FOR EFFICIENTLY RUNNING APPLICATIONS ON A WIRELESS COMMUNICATION DEVICE

(75) Inventors: Nischal Abrol, San Diego, CA (US); Marcello Lioy, San Diego, CA (US); Uppinder S. Babbar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1500 days.

(21) Appl. No.: 10/805,157

(22) Filed: Mar. 19, 2004

(65) Prior Publication Data

US 2005/0030940 A1 Feb. 10, 2005

Related U.S. Application Data

(60) Provisional application No. 60/493,928, filed on Aug. 8, 2003.

(51) Int. Cl.
*H04Q 11/00* (2006.01)
(52) U.S. Cl. .................. 370/271; 370/389; 370/392
(58) Field of Classification Search .......... 370/231, 370/319; 709/203, 230
See application file for complete search history.

(56) References Cited

U.S. PATENT DOCUMENTS

| | | | |
|---|---|---|---|
| 6,331,983 B1 * | 12/2001 | Haggerty et al. | 370/400 |
| 6,751,209 B1 | 6/2004 | Hamiti et al. | |
| 6,765,909 B1 * | 7/2004 | Sen et al. | 370/392 |
| 6,791,982 B2 | 9/2004 | Westberg | |
| 7,054,268 B1 * | 5/2006 | Parantainen et al. | 370/231 |
| 7,209,946 B2 * | 4/2007 | Dowling | 709/203 |
| 7,212,511 B2 * | 5/2007 | Jonsson et al. | 370/338 |
| 2002/0052965 A1 * | 5/2002 | Dowling | 709/230 |
| 2002/0174203 A1 | 11/2002 | Kuhn et al. | |
| 2003/0130000 A1 * | 7/2003 | Le et al. | 455/502 |
| 2004/0114548 A1 * | 6/2004 | Prasad et al. | 370/319 |

FOREIGN PATENT DOCUMENTS

| | | |
|---|---|---|
| JP | 2001237891 | 2/2000 |
| WO | WO0049748 A1 | 8/2000 |
| WO | WO0124477 A2 | 4/2001 |

OTHER PUBLICATIONS

Compressing TDCP/IP Headers for Low-Speed Serial Links, V. Jacobson, Network Working Group, RFC 1144, Feb. 1990, 1, 5-6, & 9-12.*
International Search Report and Written Opinion-PCT/US04/025587, International Search Authority-European Patent Office, Apr. 11, 2006.

(Continued)

*Primary Examiner*—Rasha S Al Aubaidi
*Assistant Examiner*—Khai N Nguyen
(74) *Attorney, Agent, or Firm*—Kyong H. Macek; Kristine U. Ekwueme

(57) ABSTRACT

A majority of the IP packets sent from an IP network over a wireless network to a mobile station which is tethered to an electronic device, such as a laptop computer, are destined for applications running on the electronic device. The embodiments are for snooping and filtering incoming IP packets to delineate only those packets destined for mobile station applications, which greatly improves the processing efficiency of the mobile station. In particular, the CID fields of TCP/IP packets utilizing Van Jacobson compression techniques are snooped and filtered.

34 Claims, 5 Drawing Sheets

OTHER PUBLICATIONS

Supplementary European Search Report-EP04780425-European Search Authority. Munich-Sep. 9, 2009.

Casner, S. et al.: "Compressing IP/UDP/RTP Headers for Low-Speed Serial Links," IETF Network Working Group, RFC 2508 (Feb. 1999).

* cited by examiner

APPARATUS AND METHOD FOR EFFICIENTLY RUNNING APPLICATIONS ON A WIRELESS COMMUNICATION DEVICE

RELATED APPLICATIONS

This Application claims priority to U.S. Provisional Application Ser. No. 60/493,928; filed on Aug. 8, 2003.

FIELD

The present invention relates generally to communications, and more specifically, to the transmission of data over wireless communication systems.

BACKGROUND

Various domestic and international standards have been established for the over-the-air interfaces associated with cellular telephone systems, each system being based upon multiple access techniques such as frequency division multiple access (FDMA), time division multiple access (TDMA), or code division multiple access (CDMA). Some of the more well-known of these standards are Advanced Mobile Phone Service (AMPS), Global System for Mobile (GSM), and Interim Standard 95 (IS-95). IS-95 and its derivatives, IS-95A, IS-95B, ANSI J-STD-008 (referred to collectively herein as IS-95), and other high-data-rate systems are promulgated by the Telecommunication Industry Association (TIA) and like standards bodies. Cellular systems, as used herein, includes cellular and personal communications services (PCS) frequencies.

IS-95 cellular telephone systems use CDMA signal processing techniques to provide efficient and robust cellular telephone service. Cellular telephone systems configured substantially in accordance with the use of the IS-95 standard are described in U.S. Pat. Nos. 5,103,459 and 4,901,307, which are assigned to the assignee of the present invention and are incorporated by reference herein. CDMA techniques are also used in the cdma2000 ITU-R Radio Transmission Technology (RTT) Candidate Submission (referred to herein as cdma2000), issued by the TIA. The standard for cdma2000 is given in the draft versions of IS-2000 and IS-856 (cdma2000 1×EV-DO). The cdma2000 1×EV-DO communication system defines a set of data rates, ranging from 38.4 kbps to 2.4 Mbps, at which a base station (BS) may communicate with a wireless communication device.

Given the growing demand for wireless data applications, the need for very efficient wireless data communication systems has become increasingly significant. In particular, as computer users have become increasingly mobile, the need has arisen to access the internet protocol (IP) network via the wireless networks on an efficient and high-speed basis. IP network access may be provided through a wireless network by tethering a wireless communication device to an electronic computing device, the tether comprising either a physical or wireless connection. The electronic computing device is referred to hereinafter as terminal equipment (TE). Applicable wireless communication devices are also referred to as "mobile stations" (MS) or "user equipment" (UE) in some of the wireless communication standards. For illustrative ease, the terminology "MS" will be used hereinafter. A MS may be, for example, a cellular phone, a personal digital assistant (PDA), a wireless modem, combinations thereof, or the like. A TE may be a computing device, such as, for example, a laptop computer, a desktop computer, a PDA, or combinations thereof. The wireless or physical medium between a MS and TE may include one or more PCMCIA cards, Universal Serial Bus (USB) media, serial media, BlueTooth, IEEE 802.11, or the like. The wireless medium between the MS and the TE, and between the MS and the network, may perform transmission of data packets that originate or terminate at points within an IP network.

A myriad of protocols exist for transmitting packetized traffic between points within IP networks, so that information arrives at its intended destination. A principal such protocol is "The Internet Protocol," Request for Comment (RFC) 791 (September, 1981). The IP protocol requires that each data packet begins with an IP header containing source and destination address fields that uniquely identify host and destination points. Addresses for destination points and source points are differentiated by the unique IP address in a header portion of each data packet. The IP protocol provides for the fragmentation of large data packets into a train of smaller packets before transmission, so that a destination point must be able to reassemble the large packet from the smaller packets upon receipt of the destination IP address fields of the smaller packets. The most recent version of the IP protocol is IPv6. IPv6 uses larger IP address lengths (128 bits as compared to the 32 bits that was standardized in the old protocol, IPv4), and thus can support more devices on the network. Another protocol is "IP Mobility Support," promulgated in RFC 2002 (October 1996), which is a protocol that provides for transparent routing of IP datagrams to mobile nodes.

The Point-to-Point Protocol (PPP), promulgated in RFC 1661 (July 1994), provides a standard method in the link layer of a communication for encapsulating IP information over point-to-point links. As such, PPP provides for the use of Transmission Control Protocol/Internet Protocol (TCP/IP) networking applications at and among points on a network. TCP/IP is the collection of networking protocols that provide a framework used by applications to communicate information over a network. TCP/IP includes IP protocol in the network layer of a communication and TCP protocol in the transport layer of a communication. IP is the central, unifying protocol in TCP/IP, and as such, provides the basic delivery mechanism for packets of data sent between all points on a network.

The Transmission Control Protocol (TCP) provides a reliable transfer between two points on a network. TCP assures data integrity by assuring the ordered and complete delivery of data. TCP depends on IP to move packets from point to point on the network. TCP establishes and ends a connection with the destination IP address via an exchange of management packets. Each application running TCP distinguishes itself from other applications at the same network point by reserving a 16-bit port number. Port numbers are placed in the TCP header by the originator of the packet before the packet is passed to the network, and the destination port number allows the IP packet to be delivered to the intended recipient at the destination point.

In the communication protocols discussed hereinabove, and particularly in PPP, data is sent over slow serial links. Compression was designed to alleviate this slowness. More specifically, because the point-to-point efficiency of a protocol is related to the ratio of data to the entire packet (including header information and data) sent over the serial line, header compression is motivated by the need for improved interactive response over serial lines.

Van Jacobson header compression (VJ compression) was designed to compress the header transmission of TCP/IP. Each TCP/IP packet has a header, normally 40 bytes in length. Of these 40 bytes, 20 bytes are normally assigned to IP fields and 20 bytes are normally assigned to TCP fields. Van Jacobson compression reduces the size of a TCP/IP header to as few as three bytes.

The initial TCP/IP header sent for a TCP/IP session contains the necessary information to exchange the IP packet with the right destination, and to exchange data with the right port at the right destination, for a given TCP/IP session. However, once an initial header is received and the session is established, the end points of the TCP/IP session over the PPP need only be informed of which session the incoming TCP/IP is associated with, because the remainder of the addressing fields in the header remain static for the duration of the session. Thus, most of the static addressing fields needed in the initial TCP/IP header can be eliminated in subsequent headers for that session. The elimination of these static header fields after receipt of the initial uncompressed TCP/IP header constitutes the VJ compression of the subsequent TCP/IP headers.

Note that an IP packet is a non-TCP/IP packet, or an uncompressable TCP/IP packet, in accordance with RFC 1144 (February 1990). A VJ uncompressed packet is similar to an P packet, but has a connection identification (CID) replacing the IP protocol field in the IP packet. A VJ compressed packet has a VJ compressed header, but also includes a CID. The CID is used to identify the connection at a source from which a communication originated, or at a destination to which information is targeted. As such, the CID may represent the respective ports through which sending application software and receiving application software communicate. Due to the fact that a sending port and a receiving port can track an active communication once that communication is originated, subsequent TCP/IP packets after the originating TCP/IP packet need only send a CID to the destination rather than detailed addressing information. This use of the CID is enabled because the sender and receiver retain the original detailed addressing information from the originating IP packet for the duration of the communication link, and thus can send communications to the correct destination using only the short-hand of the CID.

The transmission of data packets using compression from the IP network over a wireless communication network, or from the wireless communication network over the IP network, is allowed by adherence to a set of protocols. This set of protocols is referred to as a protocol stack. A MS may be the origination or the destination of an IP packet, or the MS may be a gateway to an electronic device that is the origination or destination of an IP packet.

IP packets are transported between the wireless communication network and an IP network destination via a packet data service node (PDSN) in the wireless communication network that provides access to the IP network. The TCP/IP header in non-initial communications through the PDSN is often VJ compressed. The VJ compressed TCP/IP header and the accompanying TCP/IP packet data are embedded as part of the data of the PPP packet.

An MS typically has more limited computing power than a stationary electronic device due, in part, to hardware and size restrictions. Running software applications on both the MS and the TE, while the MS and TE share the MS as the gateway to the wireless network and the IP network, also causes severe computing limitations. Thus, it would be desirable, in order to minimize the computing necessary at the MS which serves as the gateway to the wireless and IP networks, to provide an efficient way for an MS to detect whether an incoming packet is an IP packet. Likewise, it would be desirable for the MS to detect whether a TCP/IP packet header is VJ compressed or VJ uncompressed and, if the incoming packet header is VJ compressed, to assess the destination of the incoming packet without uncompressing the VJ compressed header.

Therefore, the need exists for an apparatus, system and method that improves the efficiency of the MS in filtering VJ compressed TCP/IP headers, and improves the efficiency of the MS in assessing the destination of IP packets.

BRIEF SUMMARY

In one aspect of the invention, a snooper is presented for efficiently processing at least one packet incoming to a mobile station. The snooper includes a receiver for receiving VJ compressed ones of the at least one packet; a storage, communicatively associated with the receiver, for storing at least one list, wherein the at least one list includes at least one connection identification of at least one of an active originator and an active destination for ones of the at least one packet; and a comparator for delineating a received connection identification of one of the VJ compressed ones of the at least one packet received at the receiver against the at least one list.

In another aspect, a filter is presented for efficiently processing at least one packet incoming to a mobile station. The filter includes a receiver for receiving IP ones and VJ uncompressed ones of the at least one packet; a delineator for delineating the IP ones from the VJ uncompressed ones of the packets, wherein the delineator seeks a connection identification in a one of the VJ uncompressed packets upon delineation of the one of the VJ uncompressed packets as destined for the mobile station, and wherein the delineator forwards the connection identification to a connection identification list for subsequently assessing a destination of at least one VJ compressed packet associated with the one of the VJ uncompressed packets.

In another aspect, a method is presented for efficiently processing at least one packet incoming to a mobile station. The method includes receiving VJ compressed ones of the at least one packet; storing at least one list, wherein the at least one list includes at least one connection identification of at least one of an active originator and an active destination for ones of the at least one packet; and comparing a received connection identification of one of the VJ compressed ones of the at least one packet against the at least one list.

In another aspect, a method is presented for efficiently filtering at least one packet incoming to a mobile station. The method includes receiving IP ones and VJ uncompressed ones of the at least one packet; delineating the IP ones from the VJ uncompressed ones of the IP packets; seeking a connection identification in a one of the VJ uncompressed packets upon delineating of the one of the VJ uncompressed packets as destined for the mobile station; and forwarding the connection identification to a connection identification list.

In another aspect, a system is presented for efficiently processing at least one packet incoming to a mobile station. The system includes a mobile station; a filter resident on the mobile station that differentiates IP ones of the at least one packet and VJ uncompressed ones of the at least one packet; at least one PDSN in communication with the mobile station; at least one terminal equipment communicatively tethered to the mobile station; at least one snooper on the mobile station, wherein the snooper receives at least one VJ compressed packet incoming to the mobile station from at least one of the PDSN and the terminal equipment, wherein the at least one VJ compressed packet is compared by the snooper to at least one list that includes at least one connection identification of at least one of an active originator and an active destination for ones of the at least one packet, wherein the active destination is resident at at least one of the terminal equipment and a site associated with the PDSN; and at least one connection local to the mobile station for receiving the at least one VJ compressed packet having the connection identifier that matches the at least one list.

In another aspect, a snooper is presented for efficiently processing at least one Internet Protocol (IP) packet incoming to a mobile station, comprising: at least one storage element for storing at least one list of Van Jacobson (VJ) connection identifications (CID), each VJ CID associated with an active application running on the mobile station; and a processing element configured to delineate between a packet with a VJ CID and a packet without a VJ CID, and if the packet has a VJ CID, to compare the VJ CID against the entries of the at least one list.

Thus, the present invention provides apparatus, systems and methods that improve the efficiency of the MS in filtering VJ compressed TCP/IP headers, and improve the efficiency of the MS in assessing the destination of IP packets having VJ compressed TCP/IP headers without uncompressing the VJ compressed TCP/IP headers of such IP packets.

BRIEF DESCRIPTION OF THE DRAWINGS

The disclosure herein will be described in greater detail with reference to the following drawings, wherein like reference numerals designate like elements, and wherein.

DETAILED DESCRIPTION

It is to be understood that the figures and descriptions herein have been simplified to illustrate elements that are relevant for a clear understanding of the discussion herein, while eliminating, for purposes of clarity, many other elements found in a typical network communication apparatus, system and method. But because such elements are well known in the art, and because they do not facilitate a better understanding of the discussion herein, a discussion of such elements is not provided herein. The disclosure herein is directed to all such variations and modifications to the applications, networks, and systems disclosed herein and as will be known, or apparent, to those skilled in the art.

Figure 1:
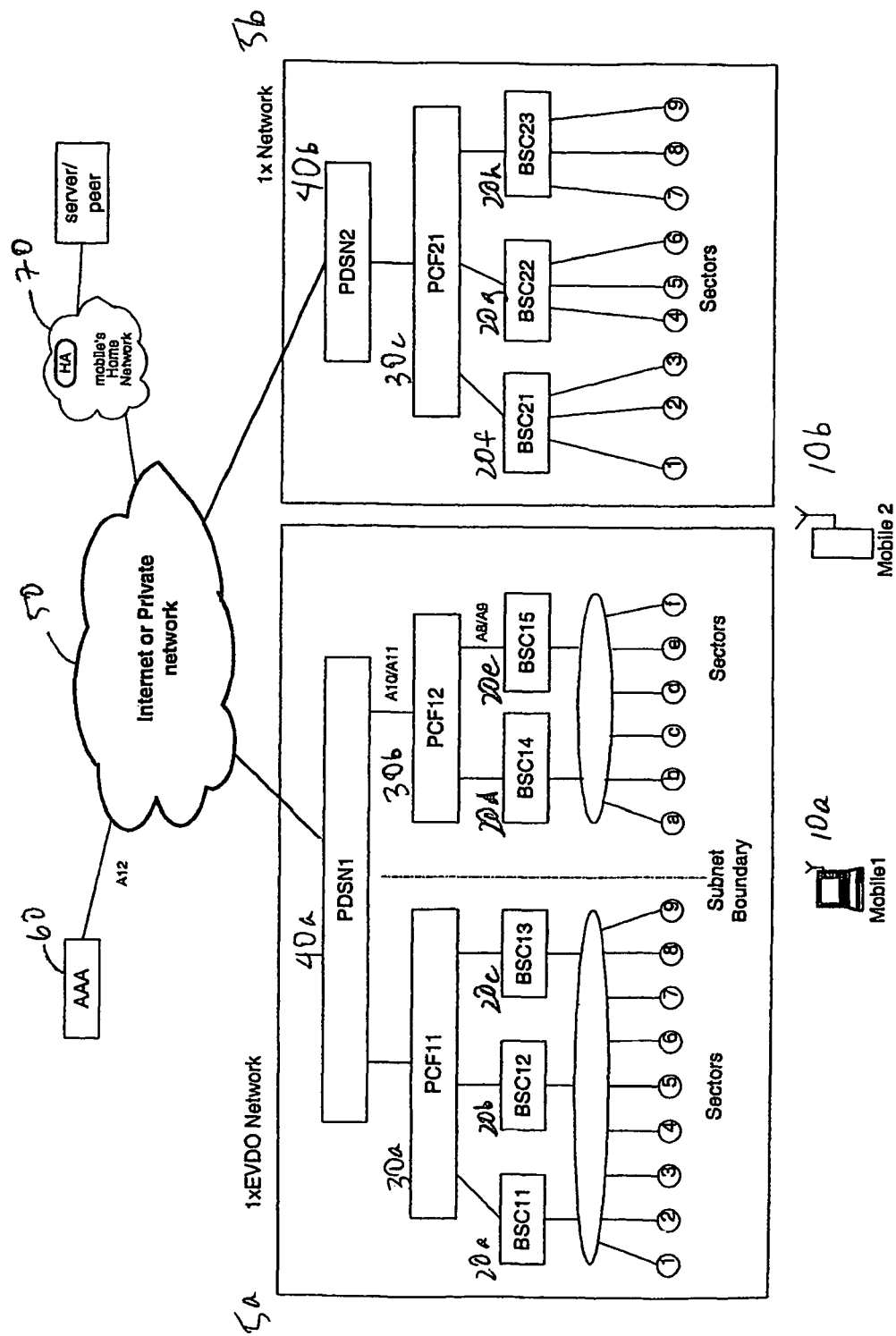
FIG. 1 is a block diagram of the interaction of an MS, a wireless network, and an IP network.

FIG. 1 illustrates the connections between a plurality of mobile stations (MS) and various infrastructure elements of two CDMA-based systems. A plurality of MSs 10a-b operates within sectors of a plurality of base station controllers (BSCs) 20a-c, 20d-e, 20f-h of different networks 5a, 5b. The BSCs 20a-c, 20d-e, 20f-h are supported by packet control functions (PCF) 30a, 30b, 30c, respectively. Some PCFs 30a, 30b are supported by a PDSN 40a of one network 5a, while other PCFs 30c are supported by a PDSN 40b of another network 5b. It should be understood by one of skill in the art that there could be any number of MS 10, BSC 20, PCF 30 and PDSN 40 elements. The PDSNs 40a, 40b are coupled to an IP or private network 50, which is coupled to a Home Agent 70 of the MSs 10.

MS 10 may be any of a number of different types of wireless communication devices such as a portable phone, a cellular telephone, a cellular telephone that is connected to a laptop computer running IP-based applications, a cellular telephone with associated hands-free car kit, a personal data assistant (PDA) running IP-based applications, a wireless communication module incorporated into a portable computer, or a fixed location communication module such as might be found in a wireless local loop or meter reading system.

A "handoff" occurs when a MS moves from the support of one base station to the support of another base station. Handoffs may be "soft," wherein the device is in communication with both base stations at the same time during the handoff process, or "hard," wherein the device ends communications with one base station before beginning communications with another base station. A handoff between one CDMA air interface system and another air interface system is referred to as a "dormant" handoff when a data session is connected, but not active. In other words, the MS and the PDSN maintain the PPP state but do not transfer data in a dormant handoff. When the MS is actively transferring to a PDSN, then the session is referred to as an "active data session."

A MS may be tethered to one or more terminal equipment devices (TE), and the MS may provide access to an IP network via the wireless network. The MS may provide a gateway for the TE to send and receive TCP/IP packets along the IP network via the wireless network.

The TCP/IP includes a header detailing the specifics of the TCP/IP packet data correspondent to that header. The TCP/IP header may be Van Jacobson (VJ) compressed in order to improve communication efficiencies, particularly over the limited bandwidth connection of the MS to the wireless network.

The travel of TCP/IP packets between the wireless network and the IP network is inefficient because the MS uncompresses all TCP/IP packets having VJ compressed headers incoming to the MS. The MS uncompresses the VJ compressed headers in order to assess whether the TCP/IP packets are destined for the MS or for the TE that is tethered to the MS. The embodiments described herein illustrate a filter that improves computing efficiency for a MS that is used as a gateway for a TE by, among other things, directing incoming TCP/IP packets having VJ uncompressed headers to the correct destination. The embodiments described herein also illustrate a snooper that distinguishes and selects IP packets having VJ compressed headers for uncompressing at the MS, and forwards those packets with VJ compressed headers that are not destined for the MS to the TE without uncompressing.

It will be apparent to those skilled in the art in light of the disclosure herein that the present systems and methods may be employed not only in a CDMA2000 network, but also in an Universal Mobile Telecommunications System (UMTS) network, or any other network in which a single IP address is assigned for both the MS and the TE.

Figure 2:
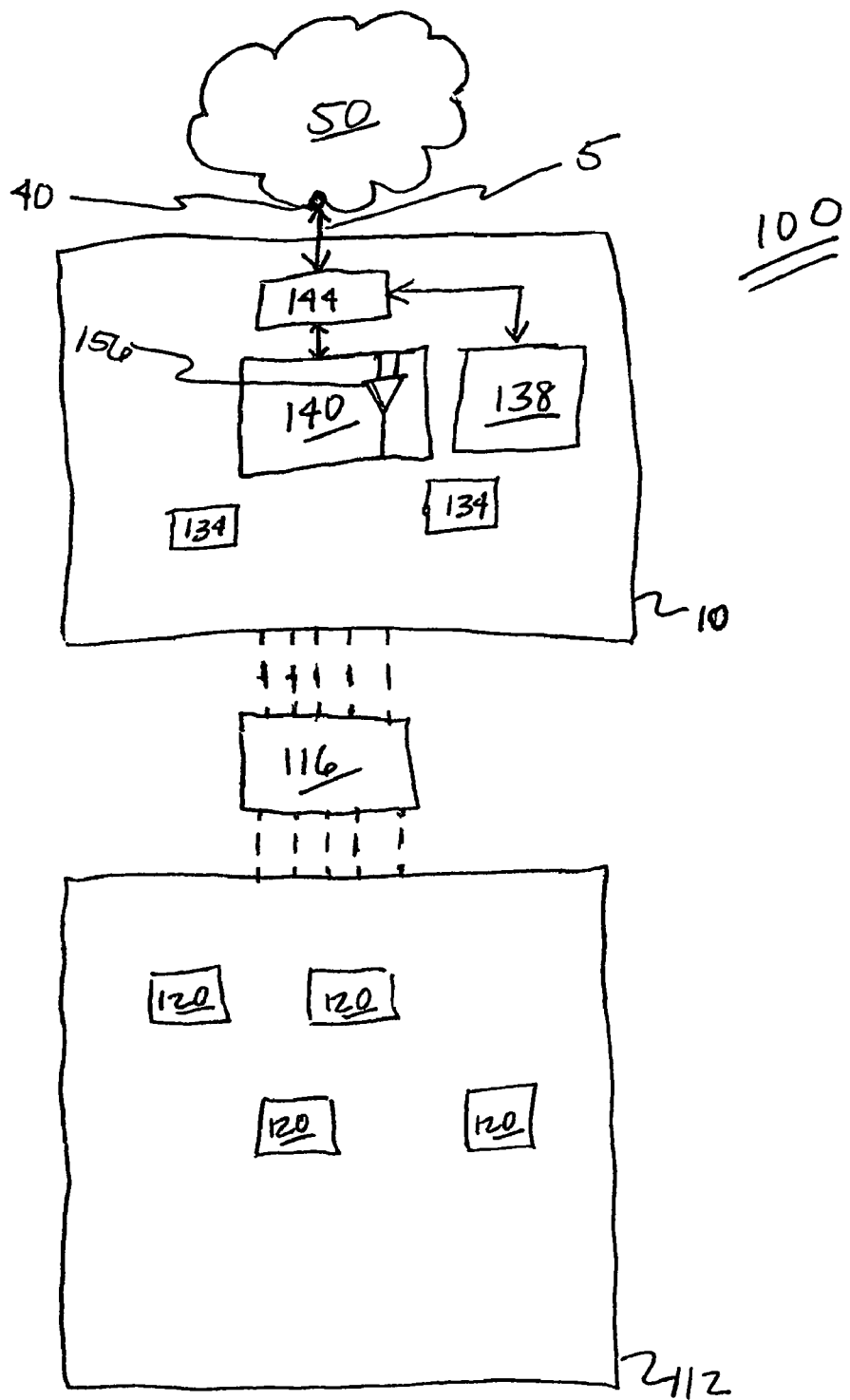
FIG. 2 is a block diagram illustrating a system of accessing, by a mobile computing device, of a networked connection.

FIG. 2 is a block diagram illustrating a system and apparatus 100 for accessing a wireless network 5 by terminal equipment (TE) 112 via the MS 10. The wireless network 5 is connected, via a PDSN 40, to an IP network 50. The system includes a TE 112 running one or more TE applications 120. Applications, as used herein, include one or more computer software programs that perform one or more computing functions. As used herein, MS applications 134 are run by at least one processor at the MS 10, and TE applications 120 are run by at least one processor at the TE 112. At least one of the TE applications 120 exchanges IP packets, via the MS 10 and the wireless network 5, with the IP network 50.

One or more of the TE applications 120 may request access to information available on the IP network 50, such as the Global Positioning System (GPS) coordinates of the TE 112.

This request, and the responsive information to the request, pass through the IP network 50 and, via the PDSN 40, over the wireless network 5, to and from the MS 10. The MS 10 then must communicate the information to and from the TE 112. Such an information request may overlap other information requests from the TE 112 passed over the same medium 116 to the MS 10. The medium 116 between the MS 10 and the TE 112 may be a wireless or wired medium, such as one or more PCMCIA cards, USB media, serial media, BlueTooth, IEEE 802.11, or the like. The communication over the medium 116 may be a PPP based connection, an Ethernet-like connection, or any type of IP protocol connection.

The TE applications 120 may be applications running TCP/IP, and may request GPS coordinates from the IP network 50. It will be apparent to those skilled in the art that the discussion herein is not restricted to GPS requests, but can be similarly employed for any TE application 120 running TCP/IP.

The MS 10 may be any device capable of connecting the tethered TE 112 to a wireless network 5. The MS 10 may include one or more receivers 144 for receiving data. The MS 10 provides a gateway, via the wireless network 5, to the IP network 50 to which the TE applications 120 send and receive IP packets. The MS 10 passes IP packets and TCP/IP packets outgoing from the TE 112 to the wireless network 5 for entry to the IP network 50 via the PDSN 40. The MS 10 receives IP packets sent from the IP network 50, via the PDSN 40, over the wireless network 5. The MS 10 may have running thereon one or more MS applications 134. The MS applications 134 may run TCP/IP. The MS applications 134 may send and receive IP packets from the IP network 50 via the wireless network 5. Thus, both the TE applications 120 and the MS applications 134 may receive IP packets via the MS 10 from the IP network 50 over the wireless network 5.

Certain IP packets incoming to the MS from the IP network may be destined for the MS applications, and other packets incoming to the MS from the IP network may be destined for the TE applications. By virtue of MS hardware dedicated to MS applications running on the MS and to MS hardware dedicated to the transmission and reception of communications over the wireless network, the MS may have limited computing power remaining for processing IP packets. In order to alleviate unnecessary computing by the MS, such as computing on packets destined for TE applications, the MS may include at least one snooper 140 to delineate the destination of VJ compressed packets, and more specifically to delineate whether TCP/IP packets having VJ compressed headers are destined for an MS application or a TE application. As used herein, a delineator may view, identify, separate, differentiate, or any combination thereof, packetized data. In order to further alleviate unnecessary computing for the MS, the MS may include at least one filter 138 to delineate types and destinations of packets, based on packet headers of packets incoming to the MS.

Each filter may pass TCP/IP packets having VJ uncompressed headers, and IP packets, to the destination of the packet. The filter may be one or more software programs, and the software programs may be associated with hardware within the MS. The filter delineates the destination of the packets incoming to the MS. The destination, according to the header of the packet, is the TE or the MS. The destination of a VJ uncompressed header TCP/IP packet is denoted by a connection identification (CID). Upon receiving a TCP/IP packet having a VJ uncompressed header, the filter assesses whether a CID list maintained at the MS includes that particular CID as correspondent to an active MS application or an active TE application. The filter then directs the IP packet to the correct destination. If the CID of a VJ uncompressed TCP/IP packet is not on the CID list, the filter may determine that the unknown CIP should be added to the CID list.

A snooper may be one or more software programs, and the software programs may be associated with hardware within the MS. The software programs of the snooper are preferably capable of checking TCP/IP headers of TCP/IP packets for, among other information, VJ compression information and CID information. Each snooper further includes storage for storing at least one CID list of applications active at either the TE or the MS.

Each snooper receives packet information incoming to the MS from the IP network and delineates IP packets having VJ compressed headers. The filter differentiates between IP packets with VJ uncompressed headers and IP packets without either VJ uncompressed or VJ compressed headers. For IP packets without either VJ compressed or uncompressed headers, the filter may delineate by assessing and assigning the destination of that IP packet. If the destination of that IP packet is at the MS, and the destination assessed is not on the CID list, the snooper may be alerted to snoop for the incoming VJ uncompressed packets that follow.

The snooper views the CID of VJ compressed headers incoming to the snooper. The snooper includes a CID list. The CID list may include CIDs having active TCP/IP sessions, or alternatively, having the capability for TCP/IP sessions, at either the MS or at the TE. Thus, the CID list may be limited to CIDs for running MS applications. Alternatively, the CID list may be limited to running TE applications. The CID of the VJ compressed header is compared, such as by comparator 156, against the CID list in the snooper, and action is taken by the snooper to forward the packet to the destination application 120, 134 according to the outcome of the comparison against the CID list. If the CID list includes running TCP/IP MS applications, and the CID to which the TCP/IP packet having the VJ compressed header is directed is the port of a running MS application on the CID list, the header is VJ uncompressed and sent to the destination, i.e. the port of that MS application. If the CID to which the TCP/IP packet having the VJ compressed header is not directed to a running MS application on the CID list, that packet is forwarded, without uncompressing, to the destination according to the CID. Typically, that destination is the TE.

Thus, the snooper allows for an avoidance of the step of uncompressing the headers of all TCP/IP packets incoming to the MS having VJ compressed headers. Rather, the snooper delineates only those TCP/IP packets having VJ compressed headers that are destined for running MS applications, which are then uncompressed. This delineation, in an embodiment wherein the CID list includes only running MS applications, includes identifying those CIDs on the CID list and uncompressing the header of only those IP packets destined for the MS applications.

Certain of the packets sent from the TE may be destined for the MS. Thus, the delineations performed by the filter and snooper may also delineate the destination, based on the source CID, of packets incoming to the MS from the TE. If a TCP/IP packet having a VJ compressed header is destined for a running MS application from a CID at the TE on the source CID list, the MS may uncompress the header of such packets and pass those uncompressed packets to the internal stack of the MS for use by the running MS application destination. Otherwise, the TCP/IP packet having VJ compressed header is forwarded from the MS over the wireless network to the PDSN.

Likewise, if the destination of the TCP/IP packet having VJ uncompressed header from the TE is at the MS, that source CID at the TE may be added to the CID list as an active source for the MS, and snooping may begin for VJ compressed packets from the same source CID at the TE to the MS. If the destination of the TCP/IP packet having VJ uncompressed header is not at the MS, the packet may be forwarded from the MS over the wireless network to the PDSN.

In general, a majority of the packets from the wireless network to an MS which is tethered to a TE are destined for the running TE applications. Hence, by snooping and filtering to delineate only those packets destined for MS applications, processing efficiency is greatly improved at the MS.

Figure 3:
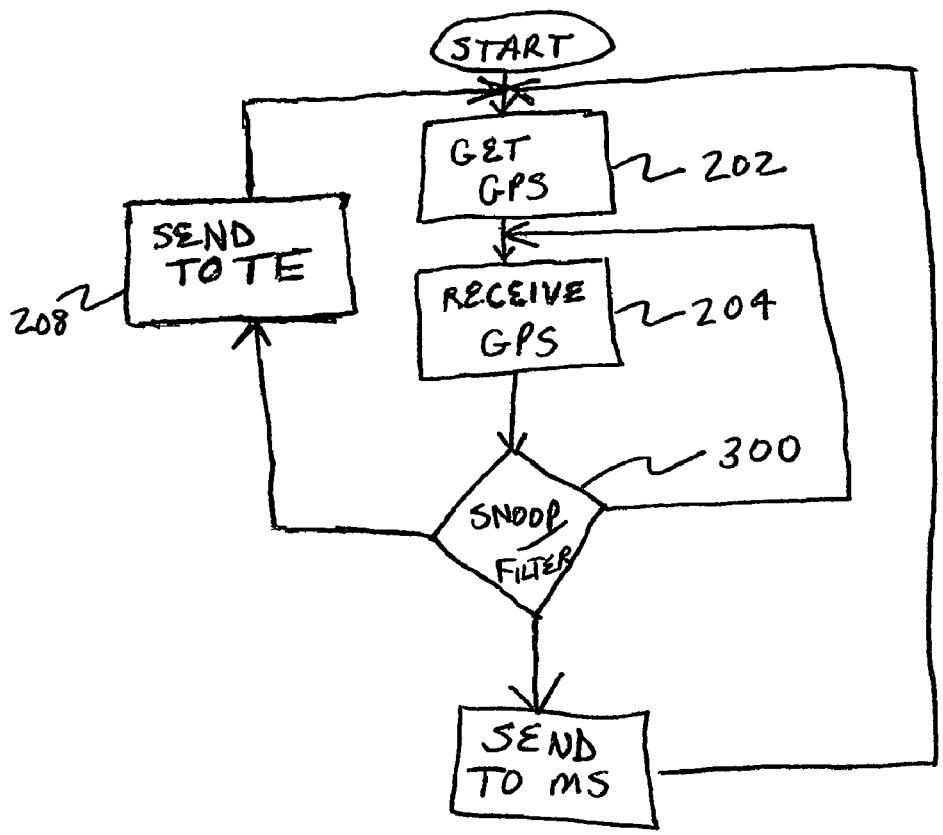
FIG. 3 is a flow diagram illustrating a method by which a mobile computing device may access information.

In FIG. 3, a TE application may request, from the IP network, the GPS position of the TE. In order to obtain the GPS position information, a TE application may make a GPS location request to an IP address, using TCP/IP, through the MS over the wireless network and the IP network 202. The site at that IP address may respond by assessing the location of the MS, such as by methods known in the art, and by sending the location of the MS, in a TCP/IP packet, over the up network, through the PDSN to the wireless network, over the wireless network to the MS, and through the gateway provided by the MS to the TE 204. If the TCP/IP packet that includes the requested GPS information has a VJ uncompressed header, the MS may route the TCP/IP packet of GPS information to the destination at the TE 208 via the filter 300. If the TCP/IP packet that includes the requested GPS information has a VJ compressed header, the MS may route the IP packet of GPS information to the destination at the TE via the snooper 300, without uncompressing the TCP/IP packet header.

A single IP address may be shared by all applications on the TE and the MS that are accessing the particular PDSN. In order to alleviate this difficulty, an artificial IP address may be assigned to the TE by the filter. For example, the artificial IP address may be assigned as 10.10.10, or a like IP address, that is not used globally on the IP network. In the example of a GPS request from the TE, the outgoing GPS request from the TE which is destined for a site on the IP network may be designated by the MS as originating from the artificial IP address assigned to the TE by the MS. The GPS information regarding the location of the MS IP address may be returned from the IP network to the MS IP address as the GPS location of the MS, but the GPS information may actually be destined, as tracked by the filter, for the artificial IP address of the TE as the originator of the request. The filter may note the artificial IP address as being on the CID list and as being requested information, and the filter or the snooper may accordingly forward the GPS information to the TE upon receipt.

Figure 4:
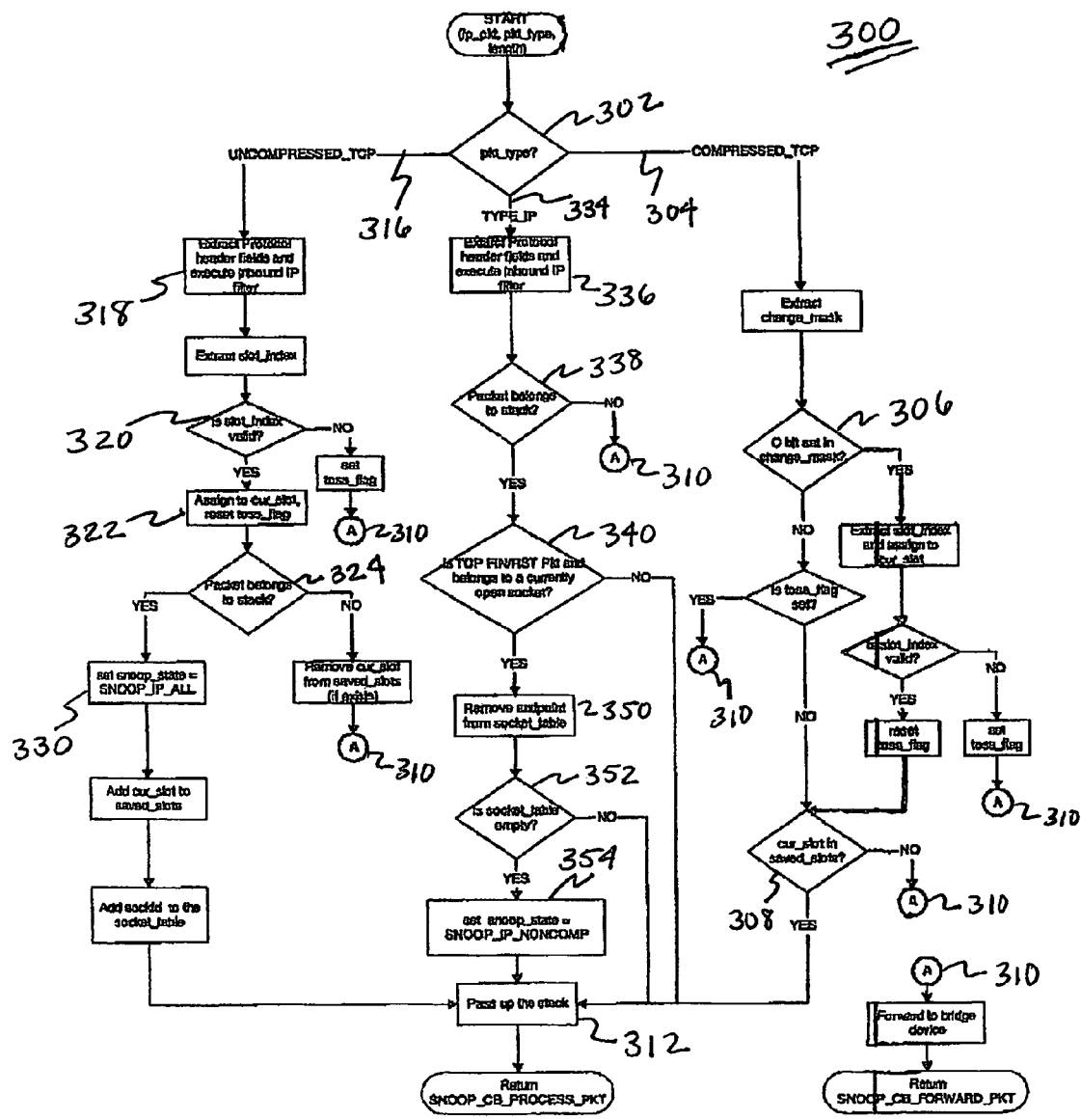
FIG. 4 is a flow diagram illustrating a method of filtering and snooping TCP/IP packets.

FIG. 4 is a flow diagram illustrating an embodiment of the snooping and filtering discussed herein. In this embodiment, the MS may continuously, or selectively, snoop and filter on the packets incoming to the MS.

To unframe and process only those packets destined for a running MS application, the snooper and filter delineate which packets are destined for MS applications. For TCP/IP packets having VJ compressed headers, the first TCP/IP packet that initiates the communication cannot include a VJ compressed header. Thus, if a series of TCP/IP packets having VJ compressed headers are preceded by a TCP/IP packet that has a VJ uncompressed header assessed by the filter as destined for the MS, those TCP/IP packets having VJ compressed headers are snooped by the snooper as destined for the MS. Receipt of that first VJ uncompressed packet destined for an MS application causes the filter to add the CID of that MS application to the CID list, and starts the snooper snooping for IP packets having VJ compressed headers destined for that CID. Received TCP/IP packets having VJ compressed headers and not having a CID on the CID list, are forwarded to the TE.

Once a CID is added to the CID list, the snooper recognizes that outgoing TCP/IP packets having VJ compressed headers may be expected to eminate from that CID. Since the source CID of such an outgoing communication may be compressed, the CID list continuously or at intervals tracks current CIDs in use, by either the TE applications or the MS applications, and may retain those active CIDs on the CID list until communication by that CID is affirmatively terminated. Upon termination of the TCP/IP communication for a CID, the MS may no longer snoop for that CID, but rather, may return to filtering for VJ uncompressed packets for that CID.

As illustrated in FIG. 4, an incoming packet may be assessed by the filter as to packet type 302, namely as an IP packet, a TCP/IP packet having a VJ uncompressed header, or a TCP/IP packet having a VJ compressed header. Non-TCP packets and uncompressible TCP packets constitute IP packets. A VJ uncompressed TCP/IP packet is an IP packet with the IP protocol field replaced with the CID. A VJ compressed TCP/IP packet includes a compressed TCP/IP header and the CID.

If the packet is a TCP/IP packet having a VJ compressed header 304, the CID of the packet is checked against the snooper CID list 306, 308, and the packet is forwarded to the TE if the CID is for a TE application, i.e. not for an MS application on the CID list. If the VJ compressed packet is destined, according to the CID list comparison, for an MS application, the packet is forwarded to the internal stack of the MS 312.

If a TCP/IP packet having a VJ uncompressed header is received 316, a destination CID is assessed 318, 320 by the filter. If the destination CID is not at the MS, the packet is forwarded to the TE 310. If the packet is for inclusion on the internal stack of the MS 324, i.e. is directed to a CID of an MS application, that CID is added to the CID list to allow the snooper to snoop all incoming IP packets 330 for that CID. If the packet is not for inclusion on the internal stack of the MS, the packet is forwarded by the filter to the TE 310.

If an IP packet is received 334, the destination of the IP packet is assessed 336, and that destination is checked for inclusion on the MS stack 338. An IP packet not for inclusion on the MS stack is forwarded to the TE 310. If the IP packet is for inclusion on the MS stack, the packet is checked for status as a TCP/IP communication 340. If the packet is a TCP/IP communication, the packet is checked for direction to an MS application 340. If the packet is directed to an MS application that is active of record, such as on the CID list 350, 352, the packet is passed up the internal stack of the MS 312. If the packet is directed to an MS application that is not active of record, and if the CID list does not include that MS application 350, 352, that packet is passed up the internal stack of the MS 312, and the snooper begins snooping for incoming TCP/IP packets having VJ uncompressed headers destined for the CID correspondent to that MS application 354. That CID may then be added to the CID list, because, if an initializing TCP/IP packet having a VJ uncompressed header arrives and is destined to that CID, additional packets having VJ compressed headers can be anticipated to and from that CID.

Figure 5:
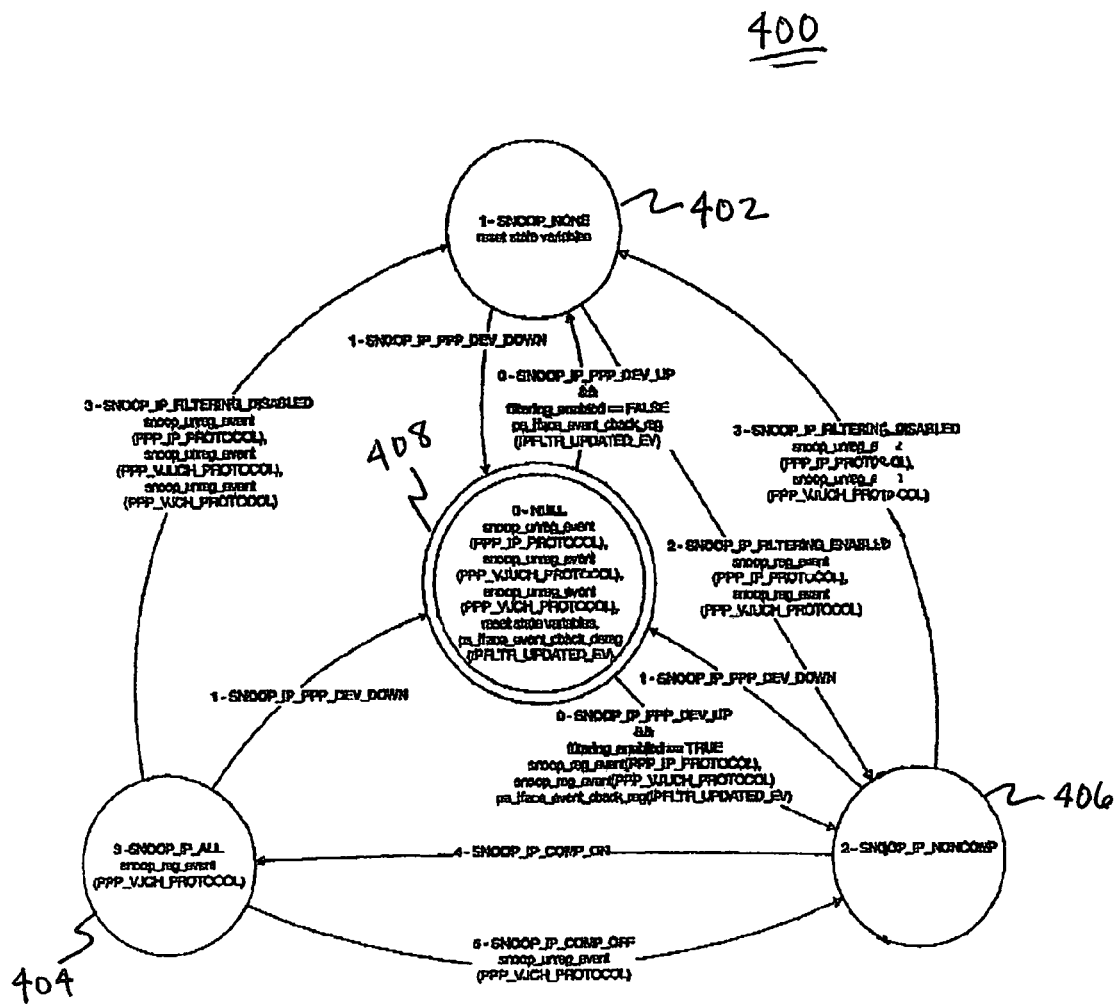
FIG. 5 is a state diagram illustrating a filter and a snooper.

FIG. 5 is a state diagram 400 illustrating the actions of a snooper and a filter. As illustrated, and in accordance with the flow of FIG. 4, if no applications are running, the snooper and filter take no action 402. State 402 is the default and reset state, which occurs before IP packet communications or upon termination of TCP/IP communication by CIDs on the CID list.

If the filter receives a VJ uncompressed packet 404, the filter assesses whether the packet is destined for an MS application. If the packet is destined for an MS application, the CID of that packet is added to the CID list, and the snooper 408 is started to snoop for subsequent packets destined for that CID.

If the filter receives an IP packet not having a VJ compressed header or a VJ uncompressed header, the snooper 408 is set to snoop for VJ uncompressed packets which provide a CID as the destination for packets subsequent to that IP packet 406. That CID is added to the CID list upon receipt of the first VJ uncompressed packet, and VJ compressed packets directed to that CID may then be snooped for uncompression and direction to MS applications, if the CID list includes active MS applications.

Those of skill will appreciate that the various illustrative logical blocks, modules, circuits, and steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described herein may be implemented or performed with a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, or any conventional processor, controller, microcontroller, or state machine. A processor may be a combination of such computing devices.

The steps described herein may be embodied in hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor. In the alternative, the storage medium may be integral to the processor.

If not otherwise stated herein, it may be assumed that all components and processes described herein may, if appropriate, be considered to be interchangeable with similar components and processes disclosed elsewhere in the specification or known to those skilled in the art. The embodiments described hereinabove are thus to be considered, in all respects, as illustrative and not restrictive. All that comes within the meaning and range, and within the equivalents, of the claims hereinbelow is therefore to be embraced within the scope thereof.

What is claimed is:

1. An apparatus housed in a wireless mobile station for efficiently processing an Internet Protocol (IP) packet incoming to the mobile station, comprising:

a receiver, at the mobile station tethered to a terminal equipment and operable to provide the terminal equipment with access to a wireless network, for wirelessly receiving an IP packet having a Transmission Control Protocol/Internet Protocol (TCP/IP) header, wherein the TCP/IP header comprises a Van Jacobson (VJ) compressed header comprising a connection identification corresponding to one of the terminal equipment, or the mobile station, or a site associated with a Packet Data Service Node (PDSN) in communication with the mobile station via the wireless network;

a storage at the mobile station, communicatively associated with said receiver, for storing a list, wherein the list comprises at least one VJ connection identification, wherein the at least one VJ connection identification identifies at least one of a first source having an active TCP/IP session with an active application on the mobile station, or a first destination corresponding to the active application on the mobile station, or a second source or a second destination both not corresponding to the active application on the mobile station; and a comparator at the mobile station for comparing the connection identification of the IP packet with the at least one VJ connection identification in the list and forwarding the IP packet based on the result of the comparing,
wherein the IP packet is forwarded without decompressing the IP packet, to the intended destination if the comparing determines that the connection identification does not correspond to the active application on the mobile station, and
wherein the IP packet is forwarded, with decompressing the IP packet, to the intended destination if the comparing determines that the connection identification corresponds to the active application on the mobile station.

2. The apparatus of claim 1, wherein said comparator forwards the IP packet, without decompressing the IP packet, if the connection identification of the IP packet matches the at least one VJ connection identification identifying either of the second source or the second destination.

3. The apparatus of claim 1, wherein the at least one VJ connection information stored in the list indicates an active destination at the mobile station.

4. The apparatus of claim 1, wherein the at least one VJ connection information stored in the list indicates an active destination at the terminal equipment associated with the mobile station.

5. The apparatus of claim 1, wherein the at least one VJ connection information stored in the list indicates an active originator of a communication between the mobile station and remote equipment corresponding to the site associated with the PDSN.

6. A filter housed on a wireless mobile station for efficiently processing data packet incoming to the mobile station, comprising:

a receiver at the mobile station for wirelessly receiving Internet Protocol (IP) data packets including Van Jacobson (VJ) compressed and uncompressed data packets;

a delineator at the mobile station for identifying the IP data packets from the VJ uncompressed data packets, wherein said delineator identifies a connection identification in at least one of the VJ uncompressed packets as destined for the mobile station, and wherein said delineator forwards the connection identification to a connection identification list for use by the delineator in subsequently assessing a destination of VJ compressed packets associated with the at least one of VJ uncompressed packets; and a tether to at least one terminal equipment communicatively associated with said delineator, wherein for a VJ compressed packet identified by the delineator as destined for the tethered terminal equipment, the delineator forwards the packet to the terminal equipment without decompressing the VJ compressed packet, and wherein for a VJ compressed packet identified by the delineator as destined for the mobile station, the delineator decompresses the VJ compressed packet.

7. The filter of claim 6, wherein, upon identification by said delineator of an IP packet destined for the mobile station, said delineator seeks a received connection identification in a subsequent one of the VJ uncompressed packets.

8. The filter of claim 6, wherein for ones of the VJ uncompressed packets not identified as destined for the mobile station, the delineator forwards the ones to the terminal equipment.

9. The filter of claim 6, further comprising a snooper, wherein the connection identification list is maintained at said snooper.

10. The filter of claim 9, wherein at least one subsequent VJ compressed packet corresponding to a one of the VJ uncompressed packets having the connection identification on the connection identification list is uncompressed at the mobile station by said snooper.

11. A method for efficiently processing a Van Jacobson (VJ) compressed data packet incoming to a wireless mobile station, comprising:

wirelessly receiving, at the mobile station tethered to a terminal equipment and operable to provide the terminal equipment with access to a wireless network, an IP packet having a Transmission Control Protocol/Internet Protocol (TCP/IP) header, wherein the TCP/IP header comprises a VJ compressed header comprising a connection identification corresponding to one of the terminal equipment, or the mobile station, or a site associated with a Packet Data Service Node (PDSN) in communication with the mobile station via the wireless network, wherein the IP packet defines a VJ compressed data packet;

storing a list, at the mobile station, wherein the list comprises at least one VJ connection identification, wherein the at least one VJ connection identification identifies at least one of a first source having an active TCP/IP session with an active application on the mobile station, or a first destination corresponding to the active application on the mobile station, or a second source or a second destination both not corresponding to the active application on the mobile station; and comparing, at the mobile station, the connection identification of the IP packet with the at least one VJ connection identification in the list and forwarding the IP packet based on the result of the comparing, wherein the IP packet is forwarded without decompressing the IP packet, to the intended destination if the comparing determines that the connection identification does not correspond to the active application on the mobile station, and wherein the IP packet is forwarded, with decompressing the IP packet, to the intended destination if the comparing determines that the connection identification corresponds to the active application on the mobile station.

12. The method of claim 11, further comprising:
alternatively uncompressing the VJ compressed data packet locally to the received connection identifier.

13. The method of claim 12, wherein said uncompressing is local at the mobile station.

14. The method of claim 11, wherein the list comprises the at least one VJ connection identification of an active destination.

15. The method of claim 11, wherein the list comprises the at least one VJ connection identification of an active originator.

16. The method of claim 11, wherein said uncompressing is local at the terminal equipment associated with the mobile station.

17. A method for efficiently filtering at least one packet incoming to a wireless mobile station having a tethered terminal equipment, comprising:

wirelessly receiving Internet Protocol (IP) data packets and Van Jacobson (VJ) compressed and uncompressed data packets at the mobile station;

identifying the IP data packets from the VJ uncompressed data packets at the mobile station;

identifying a connection identification as destined for the mobile station in a one of the VJ uncompressed packets upon said identifying of the one of the VJ uncompressed packets;

forwarding the connection identification to a connection identification list at the mobile station for use by a delineator, at the mobile station, in subsequently assessing a destination of VJ compressed packets, received at the mobile station, associated with the one of the VJ uncompressed packets;

identifying at the delineator whether a VJ compressed data packet is destined for the mobile station or for the tethered terminal equipment; and forwarding the VJ compressed data packet from the mobile station to the tethered terminal equipment without decompression when the delineator identifies the packet as being destined for the terminal equipment.

18. The method of claim 17, further comprising subsequently assessing a destination of at least one VJ compressed packet associated with the one of the VJ uncompressed packets in accordance with the connection identification list.

19. The method of claim 18, further comprising seeking a received connection identification in a subsequent one of the VJ uncompressed packets upon identifying a one of the IP packets as destined for the mobile station.

20. A system for efficiently processing a packet incoming to a wireless mobile station operable for wireless communication with a Packet Data Service Node (PDSN), comprising:

a receiver for wirelessly receiving IP and TCP/IP packets from the PDSN;

a filter resident on said mobile station that differentiates an IP packet and a Transmission Control Protocol/Internet Protocol (TCP/IP) packet having a VJ compressed header and a VJ connection identification, wherein the IP packet and the TCP/IP packet are received from the PDSN;

a snooper housed on said mobile station, wherein said snooper is operable to receive the TCP/IP packet having the VJ compressed header from the filter, and to compare the VJ connection identification to a list, stored on the mobile device, that includes a first connection identification corresponding to an active application on the mobile station, and a second connection identification corresponding to an active application on a terminal equipment tethered to the mobile station such that the mobile station is operable to provide the terminal equipment with access to a wireless network, wherein the snooper is operable to decompress the VJ compressed header to define a VJ uncompressed header and forward the TCP/IP packet with the VJ uncompressed header to the mobile station if the snooper determines that the VJ connection identification matches the first connection identification, and wherein the snooper is operable to forward the TCP/IP packet with the VJ compressed header to the terminal equipment, without decompression, if the VJ connection identification matches the second connection identification; and a connection corresponding to the active application on the mobile station and local to said mobile station for receiving the TCP/IP packet having the VJ uncompressed header if the VJ connection identification matches the first connection identification in the list.

21. A snooper housed on a wireless mobile station for efficiently processing at least one Internet Protocol (IP) packet incoming to the mobile station from a Packet Data Service Node (PDSN), comprising:

a storage element at the mobile station for storing a list of Van Jacobson (VJ) connection identifications (CID), each VJ CID associated with an active application running on the mobile station or associated with a terminal equipment tethered to the mobile station such that the mobile station is operable to provide the terminal equipment with access to a wireless network; and a processing element configured to differentiate between a packet with a VJ CID and a packet without a VJ CID, and if the packet has a VJ CID, to compare the VJ CID against the list of VJ CIDs in the list, and to forward the packet based on the comparison, wherein the processing element decompresses a compressed VJ header and forwards the packet with the decompressed VJ header to the active application running on the mobile station if the VJ CID of the packet matches the VJ CID associated with the active application running on the mobile station, and forwards the packet to the terminal equipment without decompression of the VJ header if the VJ CID of the packet matches the VJ CID associated with the terminal equipment.

22. A method for assessing the destination of an Internet Protocol (IP) packet that has arrived wirelessly at a wireless mobile station (MS), the method comprising:

maintaining a connection identification (CID) list at the MS, wherein the CID list comprises CIDs corresponding to at least one of an active MS application or an active terminal equipment (TE) application on a TE tethered to the MS, wherein the MS acts as a gateway to a wireless network for applications running on either the MS or the TE;

determining at the MS whether the IP packet has a Transmission Control Protocol/Internet Protocol (TCP/IP) packet header;

determining at the MS whether the TCP/IP packet header is Van Jacobson (VJ) compressed or VJ uncompressed;

if the TCP/IP packet header is VJ uncompressed, then assessing at the MS a destination from the TCP/IP header as either the MS or the TE, forwarding the IP packet to the assessed one of the MS or the TE, and adding a connection identification (CID) of the IP packet to the CID list;

if the TCP/ID packet header is VJ compressed, then comparing at the MS the CID of the IP packet to each CID on the CID list;

if the CID of the IP packet is on the CID list and corresponds to the active MS application, then uncompressing the VJ compressed header and passing the IP packet to the MS with the uncompressed VJ compressed header; and if the CID of the IP packet is not on the CID list or corresponds to the active TE application, then forwarding the IP packet to the TE without uncompressing the VJ compressed header.

23. Apparatus for assessing the destination of an Internet Protocol (IP) packet that has arrived wirelessly at a wireless mobile station (MS) without uncompressing a compressed header of the IP packet, wherein the MS acts as a gateway for applications running on either the MS or a terminal equipment (TE) tethered to the MS, the apparatus comprising:

means for maintaining a connection identification (CID) list at the MS, wherein the CID list comprises CIDs corresponding to at least one of an active MS application or an active terminal equipment (TE) application on a TE tethered to the MS, wherein the MS acts as a gateway to a wireless network for applications running on either the MS or the TE;

means for determining at the MS whether the IP packet has a Transmission Control Protocol/Internet Protocol (TCP/IP) packet header and for determining whether the TCP/IP packet header is Van Jacobson (VJ) compressed or VJ uncompressed;

means for assessing at the MS a destination from the TCP/IP header as either the MS or the TE, forwarding the IP packet to the assessed one of the MS or the TE, and adding a connection identification (CID) of the IP packet to the CID list if the TCP/IP packet header is VJ uncompressed;

means for comparing at the MS the CID of the IP packet to each CID on the CID list if the TCP/ID packet header is VJ compressed; and means for uncompressing the VJ compressed header and passing the IP packet to the MS with the uncompressed VJ compressed header if the CID of the IP packet is on the CID list and corresponds to the active MS application, and for passing the IP packet to the TE without uncompressing the VJ compressed header if the CID of the IP packet is not on the CID list or corresponds to the active TE application.

24. The apparatus of claim 1, wherein an IP address of the mobile station comprises a destination address for both the mobile station and the terminal equipment.

25. The filter of claim 6, wherein an IP address of the mobile station comprises a destination address for both the mobile station and the terminal equipment.

26. The method of claim 11, wherein an IP address of the mobile station comprises a destination address for both the mobile station and the terminal equipment.

27. The method of claim 17, wherein an IP address of the mobile station comprises a destination address for both the mobile station and the terminal equipment.

28. The system of claim 20, wherein an IP address of the mobile station comprises a destination address for both the mobile station and the terminal equipment.

29. The snooper of claim 21, wherein an IP address of the mobile station comprises a destination address for both the mobile station and the terminal equipment.

30. The method of claim 22, wherein an IP address of the mobile station comprises a destination address for both the mobile station and the terminal equipment.

31. The apparatus of claim 23, wherein an IP address of the mobile station comprises a destination address for both the mobile station and the terminal equipment.

32. A software module embodied in a computer readable storage medium, the storage medium encoded with code capable of being executed by a computer for efficiently processing a Van Jacobson (VJ) compressed data packet incoming to a wireless mobile station, comprising:
- a first module operable to cause the mobile station to wirelessly receive an IP packet having a Transmission Control Protocol/Internet Protocol (TCP/IP) header, wherein the TCP/IP header comprises a VJ compressed header comprising a connection identification corresponding to one of the terminal equipment, or the mobile station, or a site associated with a Packet Data Service Node (PDSN), in communication with the mobile station via the wireless network, wherein the IP packet defines a VJ compressed data packet, wherein the mobile station is tethered to a terminal equipment and operable to provide the terminal equipment with access to a wireless network;
- a second module operable to cause the mobile station to store a list, wherein the list comprises at least one VJ connection identification, wherein the at least one VJ connection identification identifies at least one of a first source having an active TCP/IP session with an active application on the mobile station, or a first destination corresponding to the active application on the mobile station, or a second source or a second destination both not corresponding to the active application on the mobile station; and
- a third module operable to cause the mobile station to compare the connection identification of the IP packet with the at least one VJ connection identification in the list and forwarding the IP packet, without decompressing the IP packet, to the intended destination if the comparing determines that the connection identification does not correspond to the active application on the mobile station, and forwarding the IP packet, with decompressing the IP packet, to the intended destination if the comparing determines that the connection identification corresponds to the active application on the mobile station.

33. A software module embodied in a computer readable storage medium, the storage medium encoded with code capable of being executed by a computer for efficiently filtering at least one packet incoming to a wireless mobile station having a tethered terminal equipment, comprising:
- a first module operable to cause the mobile station to wirelessly receive IP data packets and Van Jacobson (VJ) compressed and uncompressed data packets;
- a second module operable to cause the mobile station to identify the IP data packets from the VJ uncompressed data packets;
- a third module operable to cause the mobile station to identify a connection identification as destined for the mobile station in a one of the VJ uncompressed packets upon said identifying of the one of the VJ uncompressed packets;
- a fourth module operable to cause the mobile station to forward the connection identification to a connection identification list for use by the delineator in subsequently assessing a destination of VJ compressed packets associated with the one of the VJ uncompressed packets without decompressing the packets;
- a fifth module operable to cause the mobile station to identify at the delineator whether a VJ compressed data packet is destined for the mobile station or for the tethered terminal equipment; and
- a sixth module operable to cause the mobile station to forward the VJ compressed data packet from the mobile station to the tethered terminal equipment without decompression when the delineator identifies the packet as being destined for the terminal equipment.

34. A software module embodied in a computer readable storage medium, the storage medium encoded with code capable of being executed by a computer for assessing the destination of an Internet Protocol (IP) packet that has arrived at a wireless mobile station (MS), the software module comprising:
- a first module operable to cause the MS to maintain a connection identification (CID) list at the MS, wherein the CID list comprises CIDs corresponding to at least one of an active MS application or an active terminal equipment (TE) application on a TE tethered to the MS, wherein the MS acts as a gateway to a wireless network for applications running on either the MS or the TE;
- a second module operable to cause the MS to determine whether the IP packet has a Transmission Control Protocol/Internet Protocol (TCP/IP) packet header;
- a third module operable to cause the MS to determine whether the TCP/IP packet header is Van Jacobson (VJ) compressed or VJ uncompressed;
- a fourth module operable, if the TCP/IP packet header is VJ uncompressed, to cause the MS to assess a destination from the TCP/IP header as either the MS or the TE, forwarding the IP packet to the assessed one of the MS or the TE, and adding a connection identification (CID) of the IP packet to the CID list;
- a fourth module operable, if the TCP/IP packet header is VJ compressed, to cause the MS to compare the CID of the IP packet to each CID on the CID list and to:
  - uncompress the VJ compressed header and pass the IP packet to the MS with the uncompressed VJ compressed header, if the CID of the IP packet is on the CID list and corresponds to the active MS application; and
  - forward the IP packet to the TE without uncompressing the VJ compressed header, if the CID of the IP packet is not on the CID list or corresponds to the active TE application.

* * * * *